W. P. ZEIGLER.
ARTIFICIAL FISH BAIT.
APPLICATION FILED APR. 23, 1915.

1,180,753.

Patented Apr. 25, 1916.

WITNESS
J. Herbert Bradley.

INVENTOR
William P. Zeigler

UNITED STATES PATENT OFFICE.

WILLIAM P. ZEIGLER, OF AMBRIDGE, PENNSYLVANIA, ASSIGNOR OF ONE-HALF TO GEORGE DAVIS, OF AMBRIDGE, PENNSYLVANIA.

ARTIFICIAL FISH-BAIT.

1,180,753.     Specification of Letters Patent.     Patented Apr. 25, 1916.

Application filed April 23, 1915. Serial No. 23,351.

*To all whom it may concern:*

Be it known that I, WILLIAM P. ZEIGLER, a citizen of the United States, residing at Ambridge, in the State of Pennsylvania, have invented certain new and useful Improvements in Artificial Fish-Baits, of which the following is a specification.

My invention relates more particularly to artificial baits for trawling, and its primary objects are to make the bait more attractive to the fish, to secure its proper position in the water, to provide a convenient and effective hanging of the hooks, and to generally improve the structure and operation of trawling baits.

I have illustrated a preferred form in the accompanying drawing:—in which—.

Figure 1:
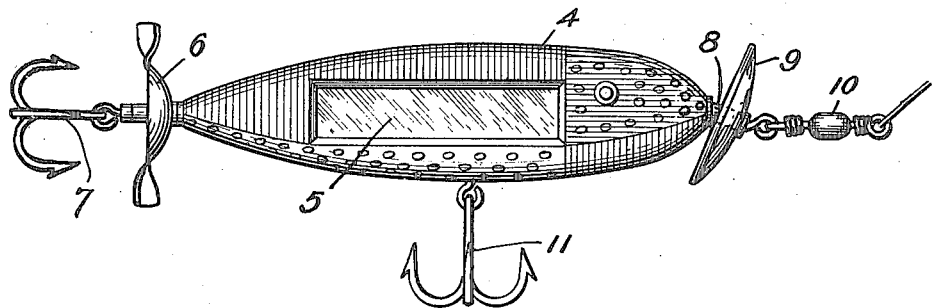
Figure 2:
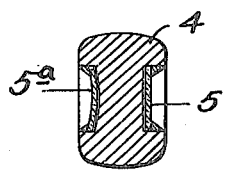

Figure 1 is a side elevation, and Fig. 2 is a central vertical section.

Preferably I make the body 4 of the bait of wood, and in the sides, in a deep countersink, I place a glass mirror 5 in the position shown, being aranged to stand vertically when the bait is in proper position in the water. The bait is made in imitation of a fish, preferably with a green head, white and red speckled belly, and dark red back. At the tail I place a spinner 6, preferably in the form of a partial sphere with blades as shown, and back of this hangs one of the hooks 7. At the front I provide an inclined spindle upon which is mounted a tube 8 having fixed to it a disk 9 of dished or partly spherical form, arranged at an incline with respect to the horizontal as shown; and in front of this the usual swivel connection 10 for the line. I may provide an additional hook 11 under the belly. The attractiveness of the bait for the fish is increased by making the disks 6 and 9 of highly polished metal. The glitter and flashing lights occasioned by these and by the mirror are well known attractives; but the mirror 5 is an additional feature that insures the effectiveness of the bait in the following manner: A male fish seeing his image upon looking therein will appear to see another fish approach it from the opposite side with the intent to seize the bait, and this will not only arouse his warlike spirit, but also appeal to his greed, and he will seize the bait quickly in order to defeat the approaching rival. In case the fish is suspected of cowardice I may make the mirror of convex form, as shown at 5ª, in order that the rival or antagonist may appear to be smaller. In the case of a female fish the attractiveness of a mirror is too well known to need discussion. Thus the bait appeals to the ruling passion of both sexes, and renders it very certain and efficient in operation.

It will be understood that for the effectiveness of the mirror it is necessary for the bait to be constantly maintained in upright position, and it is to secure this function, as well as to maintain the bait at the proper depth of water, that I use the fixed incline disk 9. That is, the disk 9 not only has the function of maintaining the bait near the top of the water (or at whatever elevation is desired), dependent on the speed of drawing it through the water, and not only has the function of keeping the bait in upright position, which is the only position a live fish occupies; but it has the additional and important function of holding the mirror steady enough for a fish to see its image therein, and it causes the image to have the appearance of another fish approaching from the opposite direction and in a natural position.

Having thus described my invention and illustrated its use, what I claim is the following:

1. In a fish bait, the combination of a body carrying a mirror in upright position, of an inclined fixed disk adapted to regulate the depth and maintain the body in upright position as it moves through the water.

2. An artificial bait comprising a body made in the form of a fish, means to maintain it in upright position as it is drawn through the water, a vertical mirror embedded in the sides of the fish, a suspended hook under the fish, and a spinner and trailing hook on the rear of the fish.

In testimony whereof I have hereunto signed my name.

WILLIAM P. ZEIGLER.